Aug. 16, 1932.  J. B. McMENAMIN  1,871,629
HEADLIGHT
Filed Nov. 17, 1930
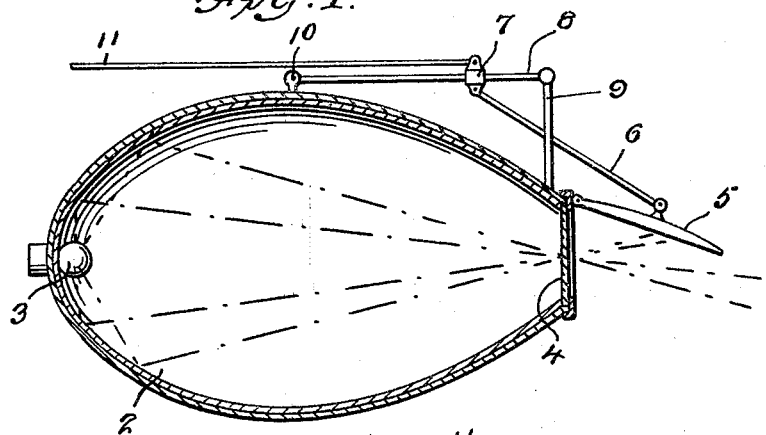
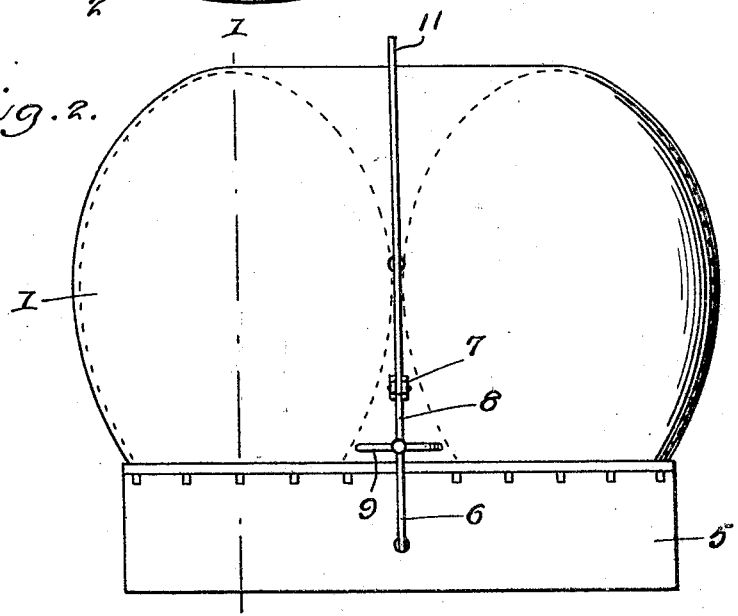
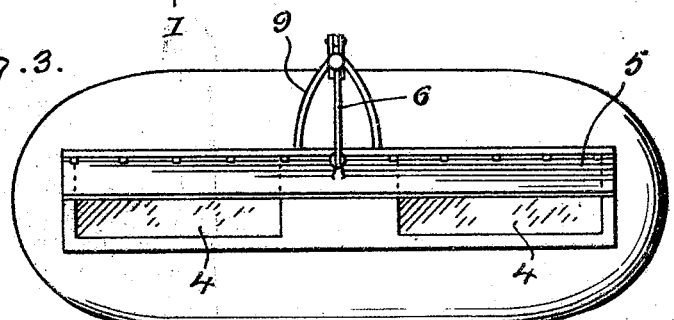

Patented Aug. 16, 1932

1,871,629

UNITED STATES PATENT OFFICE

JOSEPH B. McMENAMIN, OF PORT KENNEDY, PENNSYLVANIA

HEADLIGHT

Application filed November 17, 1930. Serial No. 496,295.

My present invention has reference to a road lamp for automobiles or like vehicles, and it consists in the novel features hereinafter described and claimed.

The object of the invention is the provision of a lamp for this purpose of a construction whereby the rays of light from the lamp bulb will be crossed or deflected prior to their passage through a somewhat restricted opening at the outer end of the lamp housing so that the full power of the light rays will be directed through the housing both upwardly, downwardly and sidewardly so that conditions as well as the roadway forward of the vehicle may be prominently observed by the driver, and further wherein means is provided for shutting off, or downwardly directing the light rays so that the same will not interfere with the eyes of approaching drivers and also so that the road condition will be perfectly apparent to the driver of the vehicle equipped with the improvement.

A further and important object of the invention is the particular and peculiar construction of the lamp housing.

The device consists of a casing having compartments therein with lenses at the light outlet openings of said compartments. A shutter is hingedly attached to the casing and adapted to close over said openings. The shutter is so arranged as to reflect rays of light passing through the openings in a downward direction and whereby the light may be used to advantage in foggy weather for illuminating the surface of a road for a considerable distance in advance of the vehicle upon which the headlight is mounted.

The invention will be fully and comprehensively understood from a consideration of the following detailed description when read in connection with the accompanying drawing which form part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Figure 1 is a sectional view through the improvement approximately on the line 1—1 of Figure 2.

Figure 2 is a top plan view thereof.

Figure 3 is a front elevation thereof.

Except for the bulb and lens the improvement is preferably wholly constructed of light but strong metal, and likewise the improvement is suitably supported on the front of a vehicle.

The casing of the improvement is indicated by the numeral 1 and has arranged therein two horizontally disposed elliptical compartments or chambers which are arranged side to side, the outer surface of the casing or housing being shaped to conform with the said compartments. Each of the compartments has an inner facing 2 of reflective material and the said facings, of course, conform to the shape of the compartments. The housing 1, at the inner end thereof, which provides the major axial walls of the elliptical compartments, have fixed thereto sockets for lamp bulbs 3. The outer walls of the compartments, describing the minor axis of the housing are cut away to provide the same with substantially rectangular openings, and each of these openings is covered by a rectangular lens 4. The lenses 4 are removably fixed in their openings, and as far as the description has progressed it will be apparent that the rays of light from the bulbs 3 will not only be centrally and longitudinally directed through the compartments, but the major portions of such rays will be directed against the round or elliptical walls of the said compartments and from thence be reflected at different and at crossed angles through the lens 4. The result is that a powerful light is emitted through the lens and such rays of light are directed both upwardly, downwardly and sideways through the lenses 4, and consequently the roadway ahead of the vehicle, the sides of the roadway and objects ahead of the vehicle will be fully and conspicuously displayed to the driver of the vehicle.

To control the upwardly directed rays of light, so that the same cannot blind the eyes of approaching pedestrians or the drivers of approaching vehicles I hingedly secure to the top of the frame of the lenses 4 a plate in the nature of a shutter 5. The shutter, on its outer face, has swivelly connected thereto a short rod 6, the said rod having its free end pivotally secured to a downwardly extending ear on a sleeve that provides a slide 7. The slide is movable on a rod or rail 8 whose outer end is supported by a forked member 9 that is fixed to and extends upwardly from the housing 1, and whose rear end is connected to a short upstanding post 10 that is also fixed on the housing. The upper ear of the slide has pivotally secured thereto an operating rod 11. It will be apparent that a push or longitudinal movement in an outward direction of the rod 11 will move the slide on its rail, and through the medium of the rod or link 6 will swing the plate or shutter 5 toward the lenses 4 and thereby regulate and control the downward direction of the light rays that pass through the lenses.

Obviously a pull or a movement of the rod 11 in a second longitudinal direction will cause the upward swinging of the shutter so that rays of light will be directed through the lenses.

It will be noted that the improvement is of a simple construction, and while the same is primarily designed for use as headlights it may be employed as an auxiliary lamp with such headlights to permit the driver of the vehicle positively and accurately determining road conditions ahead of the vehicle without subjecting his machine to the liability of running off of the road and the serious damage to life and property thus occasioned. The manner in which the light rays are controlled by the driver so that such rays cannot blind the eyes of drivers of approaching vehicles or pedestrians renders the improvement a safety as well as a life and property saving device. The headlamp is positioned on the machine close to the ground. The light is especially desirable for use in foggy weather as by adjusting the shutter the rays of light will pass downwardly and which will permit the driver to observe ground conditions for a distance in advance.

Having described the invention, I claim:

A headlight comprising a casing having a compartment provided with an opening, a lens disposed over said opening, a lamp bulb located in the compartment, a shutter hinged to the casing and adapted to move over said opening and adapted to serve as a blind for partially closing the opening and serve as a reflector for rays of light passing through the opening, a horizontal guide member mounted upon the casing, a sleeve slidable upon the guide member, a rod pivotally connected with the sleeve and the shutter and means for moving the sleeve.

In testimony whereof I affix my signature.

JOSEPH B. McMENAMIN.